(12) United States Patent
Wu

(10) Patent No.: US 9,641,768 B2
(45) Date of Patent: May 2, 2017

(54) FILTER REALIZATION METHOD AND APPARATUS OF CAMERA APPLICATION

(71) Applicant: TENCENT TECHNOLOGY (SHENZHEN) COMPANY LIMITED, Shenzhen (CN)

(72) Inventor: Yuhuan Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/102,185

(22) PCT Filed: Jan. 23, 2015

(86) PCT No.: PCT/CN2015/071417
§ 371 (c)(1),
(2) Date: Jun. 6, 2016

(87) PCT Pub. No.: WO2015/110060
PCT Pub. Date: Jul. 30, 2015

(65) Prior Publication Data
US 2016/0316151 A1    Oct. 27, 2016

(30) Foreign Application Priority Data
Jan. 26, 2014   (CN) .......................... 2014 1 0038715

(51) Int. Cl.
*G06F 9/455* (2006.01)
*H04N 5/232* (2006.01)
*H04N 5/262* (2006.01)

(52) U.S. Cl.
CPC ....... *H04N 5/2621* (2013.01); *G06F 9/45512* (2013.01); *H04N 5/23222* (2013.01)

(58) Field of Classification Search
CPC ............. H04N 5/2621; H04N 5/23222; H04N 2005/4456; H04N 7/03; H04N 13/0066; H04N 21/278; G06F 9/45512
See application file for complete search history.

(56) References Cited

U.S. PATENT DOCUMENTS 7,184,041 B2 *   2/2007   Heng ...................... G06T 15/04
                                                           345/424
8,355,594 B2 *   1/2013   Noda ...................... G06K 9/40
                                                          358/3.26

(Continued)

FOREIGN PATENT DOCUMENTS

| CN | 103076943 A | 5/2013 |
| CN | 103533240 A | 1/2014 |
| CN | 103533241 A | 1/2014 |

OTHER PUBLICATIONS

International Search Report and Written Opinion, International Application No. PCT/CN2015/071417, mailed Apr. 28, 2015.

*Primary Examiner* — Hung Lam
(74) *Attorney, Agent, or Firm* — Marshall, Gerstein & Borun LLP

(57) ABSTRACT

A filter realization method and apparatus of a camera application may include: obtaining a user-defined filter use instruction; extracting a program script according to the user-defined filter use instruction, where the program script is generated according to a user-defined photo parameter; and performing, by using the extracted program script, filter rendering on a photo obtained by triggering photographing in a camera application, to obtain a photo containing a filter effect. The apparatus includes: a filter use instruction obtaining module, configured to obtain a user-defined filter use instruction; a script extraction module, configured to extract a program script according to the user-defined filter use instruction, where the program script is generated according (Continued)

to a user-defined photo parameter; and a filter rendering module, configured to perform, by using the extracted program script, filter rendering on a photo obtained by triggering photographing in a camera application, to obtain a photo containing filter effect.

8 Claims, 5 Drawing Sheets

(56) References Cited

U.S. PATENT DOCUMENTS

| | | | | |
|---|---|---|---|---|
| 2003/0133628 A1* | 7/2003 | Lee | ............... | G06T 11/60 |
| | | | | 382/309 |
| 2005/0163462 A1* | 7/2005 | Pratt | ............... | G11B 27/11 |
| | | | | 386/233 |
| 2005/0271302 A1* | 12/2005 | Khamene | ............... | G06K 9/00986 |
| | | | | 382/294 |
| 2009/0080790 A1 | 3/2009 | Hasegawa | | |

* cited by examiner

FILTER REALIZATION METHOD AND APPARATUS OF CAMERA APPLICATION

CROSS-REFERENCE TO RELATED APPLICATION

This application is a 371 U.S. National Phase of International Application PCT/CN2015/071417, filed on Jan. 23, 2015, which claims priority to a Chinese patent application No. 201410038715.6, titled "filter realization method and apparatus of camera application", which was filed on Jan. 26, 2014. The aforementioned applications are hereby incorporated by reference in their entirety.

FIELD OF THE TECHNOLOGY

The present disclosure relates to computer application technologies, and in particular, to a filter realization method and apparatus of a camera application.

BACKGROUND OF THE DISCLOSURE

With rapid development of various mobile terminals such as smart phones, more users use their own various mobile terminals to take photos whenever and wherever possible. For example, a mobile terminal, such as a carry-on smart phone or a tablet computer, is used to take photos.

However, in a photographing process, because of a poor background or other elements, sometimes a filter needs to be used to beautify a photo, but a filter effect in an existing camera application is relatively unitary, and rich filter effects cannot be provided.

SUMMARY

Based on this, for a technical problem of a unitary filter effect in an existing camera application, it is necessary to provide a filter realization method of a camera application, where the method can provide rich filter effects.

In addition, it is further necessary to provide a filter realization apparatus of a camera application, where the apparatus can provide rich filter effects.

A filter realization method of a camera application includes the following steps:

obtaining a user-defined filter use instruction;

extracting a program script according to the user-defined filter use instruction, where the program script is generated according to a user-defined photo parameter; and performing, by using the extracted program script, filter rendering on a photo obtained by triggering photographing in a camera application, to obtain a photo containing a filter effect.

A filter realization apparatus of a camera application includes:

a filter use instruction obtaining module, configured to obtain a user-defined filter use instruction;

a script extraction module, configured to extract a program script according to the user-defined filter use instruction, where the program script is generated according to a user-defined photo parameter; and a filter rendering module, configured to perform, by using the extracted program script, filter rendering on a photo obtained by triggering photographing in a camera application, to obtain a photo containing a filter effect.

In the foregoing filter realization method and apparatus of a camera application, after a user-defined filter use instruction is obtained, a program script is extracted according to the user-defined filter use instruction, and filter rendering is performed, by using the program script, on a photo obtained by triggering photographing in a camera application, to obtain a photo containing a filter effect. Because the program script for performing filter rendering on the photo may be generated according to a user-defined photo parameter, the realized filter effect is not limited to a unitary filter effect provided by the camera application, thereby significantly enriching filter effects that can be realized by the camera application.

DESCRIPTION OF EMBODIMENTS

To make the objectives, technical solutions, and advantages of the present disclosure clearer, the present disclosure is further described in detail with reference to the accompanying drawings and embodiments. It should be understood that, the specific embodiments described herein are merely used to explain the present disclosure, but are not used to limit the present disclosure.

Unless the context clearly indicates otherwise, singular elements or components in the present disclosure may be in the plural and vice versa, which is not limited in the present disclosure. Although steps in the present disclosure are labeled with numbers, such numbers are not intended to limit the order of these steps. Unless the order of steps is explicitly stated or it is explicitly stated that a step needs to be performed on the basis of another step, the relative order of steps can be adjusted. It should be understood that as used herein, the term "and/or" involves and includes any and all combinations of one or more of the associated listed items.

Figure 1:
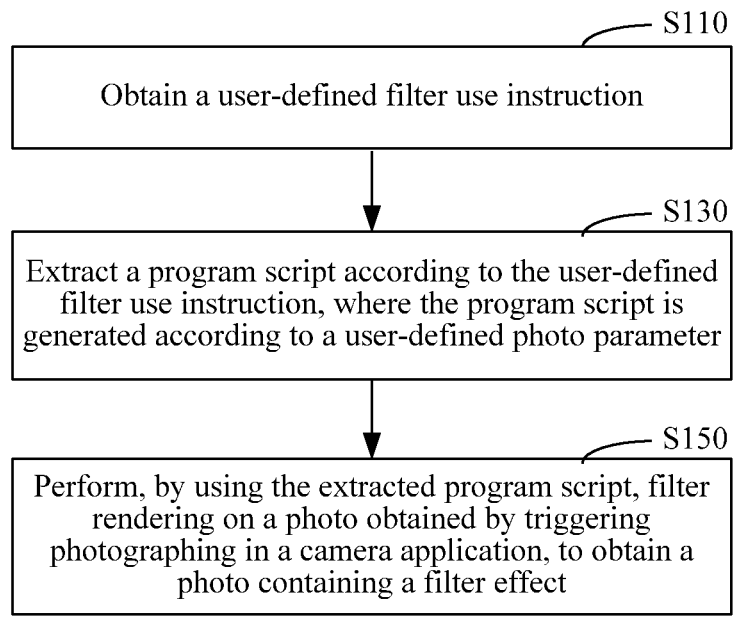
FIG. 1 is a flowchart of a filter realization method of a camera application in an embodiment.

As shown in FIG. 1, in an embodiment, a filter realization method of a camera application includes the following steps:

Step S110: Obtain a user-defined filter use instruction.

In this embodiment, the user-defined filter use instruction is generated when a user triggers an operation of using a user-defined filter in a started camera application. In a process of using the camera application to take a photo, the user chooses to use a user-defined filter or a built-in filter effect in the camera application according to requirements.

Specifically, after the camera application is started, whether to use the user-defined filter is determined, and in this case, a corresponding marquee may pop up on an interface of the camera application, so that the user triggers the operation, where if the user triggers the operation of using the user-defined filter, it indicates that the user-defined filter is used to take a photo or beautify a photo.

Step S130: Extract a program script according to the user-defined filter use instruction, where the program script is generated according to a user-defined photo parameter.

In this embodiment, the program script is an OpenGL Shading Language (GLSL) script, and is generated by the user according to a photo parameter that needs to be input in a user-defined manner, where the program script is corresponding to one filter effect, to obtain a photo containing the filter effect.

Specifically, a program script currently used by the camera application may be learned according to the user-defined filter use instruction, and the program script is further extracted, to realize a photo beautification function.

Step S150: Perform, by using the extracted program script, filter rendering on a photo obtained by triggering photographing in a camera application, to obtain a photo containing a filter effect.

In this embodiment, filter rendering is performed, by using the extracted program script, on the photo obtained by the camera application through photographing, so that the photo carries a filter effect corresponding to the program script.

By using the foregoing solution, a user may set, in a user-defined manner, a filter effect to be realized, that is, the user-defined filter effect may be obtained by generating a corresponding program script by inputting a photo parameter, which brings great convenience to the user to use a camera application, thereby further enriching filter effects that can be realized in the camera application, and significantly enhancing a photo beautification function in the camera application.

Figure 2:
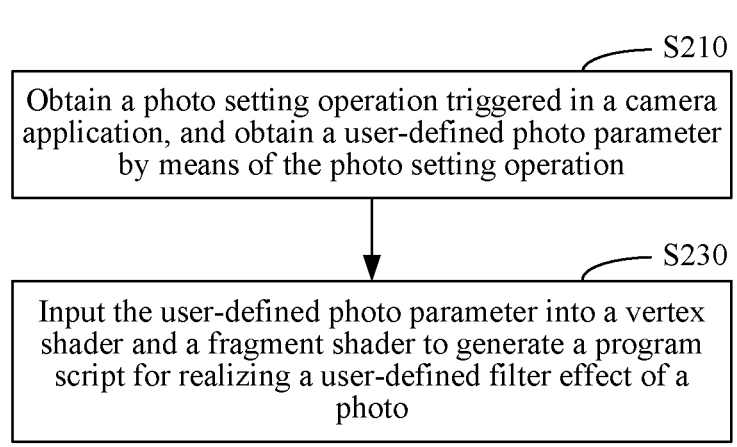
FIG. 2 is a flowchart of a filter realization method of a camera application in another embodiment.

As shown in FIG. 2, in an embodiment, before step S130, the method further includes the following steps:

Step S210: Obtain a photo setting operation triggered in a camera application, and obtain a user-defined photo parameter of the user by means of the photo setting operation.

In this embodiment, a photo setting operation triggered by the user in an operation interface of the camera application is obtained, where the photo setting operation is an operation of inputting the user-defined photo parameter of the user. The photo parameter includes a value corresponding to the hue, a value corresponding to the saturation, and a value corresponding to the brightness, and the photo parameter determines the red green blue hue of pixel points in the photo.

Step S230: Input the user-defined photo parameter into a vertex shader and a fragment shader to generate a program script for realizing a user-defined filter effect of a photo.

In this embodiment, the vertex shader is used to calculate a location of the vertex in the photo, and transfer calculated data to the fragment shader, where the fragment shader is used to set a final color for a first pixel in the photo, and both the vertex shader and the fragment shader are based on the user-defined photo parameter of the user.

The user may randomly set the photo parameter in a user-defined manner according to requirements, to generate a corresponding program script, thereby further providing various filter effects to the photo of the camera application.

Further, the program script generated according to the user-defined photo parameter of the user is saved to a user-defined filter gallery, so that the program script can be invoked at any time.

Figure 3:
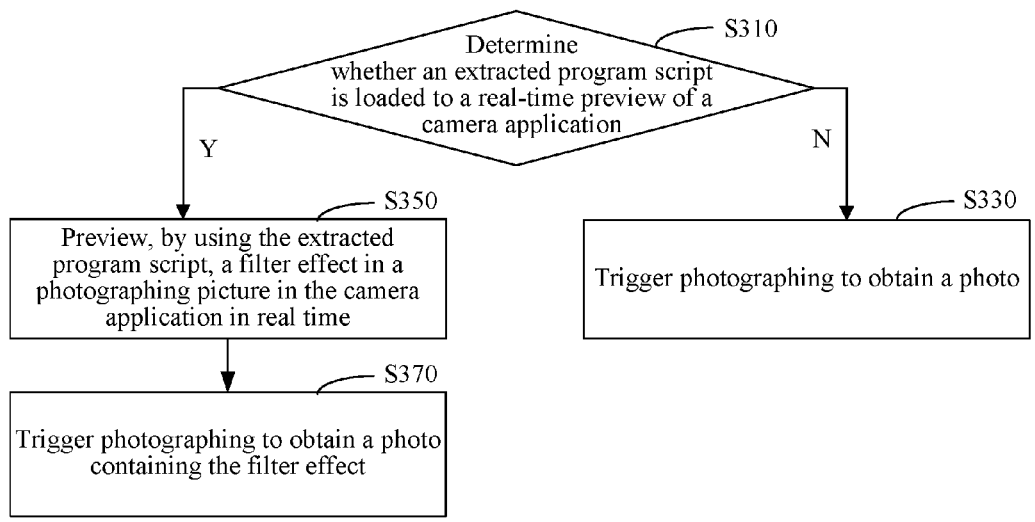
FIG. 3 is a flowchart of a filter realization method of a camera application in another embodiment.

As shown in FIG. 3, in an embodiment, before step S150, the method further includes the following steps:

Step S310: Determine whether an extracted program script is loaded to a real-time preview of a camera application, if not, perform step S330, and if yes, perform step S350.

In this embodiment, after the program script generated according to the user-defined photo parameter is obtained, whether to load the program script to the real-time preview of the camera application is determined. If not, it indicates that the user expects to perform filter rendering on a photo after obtaining the photo through photographing, and if yes, it indicates that a filter effect corresponding to the program script is previewed in a current photographing picture in the camera application in real time, to preview the filter effect of the current photographing picture in real time.

Step S330: Trigger photographing to obtain a photo.

In this embodiment, after it is determined that the extracted program script is not loaded to the real-time preview of the camera application, the camera application is triggered to perform photographing by means of a user operation, to obtain a photo corresponding to the current photographing picture.

Step S350: Preview, by using the extracted program script, a filter effect in a photographing picture in the camera application in real time.

In this embodiment, after it is determined that the extracted program script is loaded to the real-time preview of the camera application, the filter effect of the current photographing picture is previewed in the camera application, so that the user views whether the current photographing picture is suitable, and further triggers photographing to obtain a photo containing the filter effect.

Step S370: Trigger photographing to obtain a photo containing the filter effect.

Figure 4:
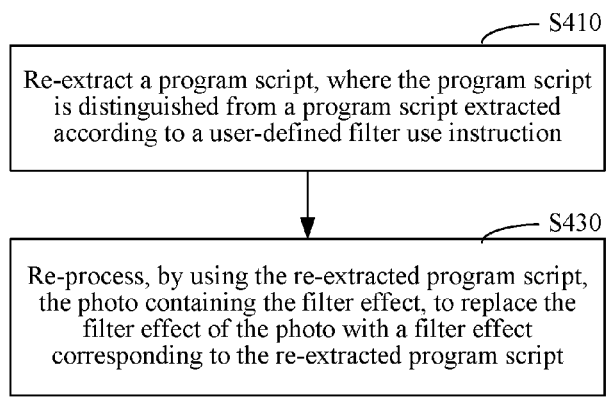
FIG. 4 is a flowchart of a filter realization method of a camera application in another embodiment.

As shown in FIG. 4, in an embodiment, the method further includes the following steps:

Step S410: Re-extract a program script, where the program script is distinguished from a program script extracted according to a user-defined filter use instruction.

In this embodiment, for a photo that contains a filter effect and is obtained by performing filter rendering, another program script may be further extracted to change the filter effect in the photo.

Step S430: Re-process, by using the re-extracted program script, the photo containing the filter effect, to replace the filter effect of the photo with a filter effect corresponding to the re-extracted program script.

In this embodiment, secondary beautification is performed on the photo containing the filter effect, that is, filter rendering is performed again to replace the filter effect in the photo with another user-defined filter effect, to finally obtain a most satisfactory photo of the user.

Figure 5:
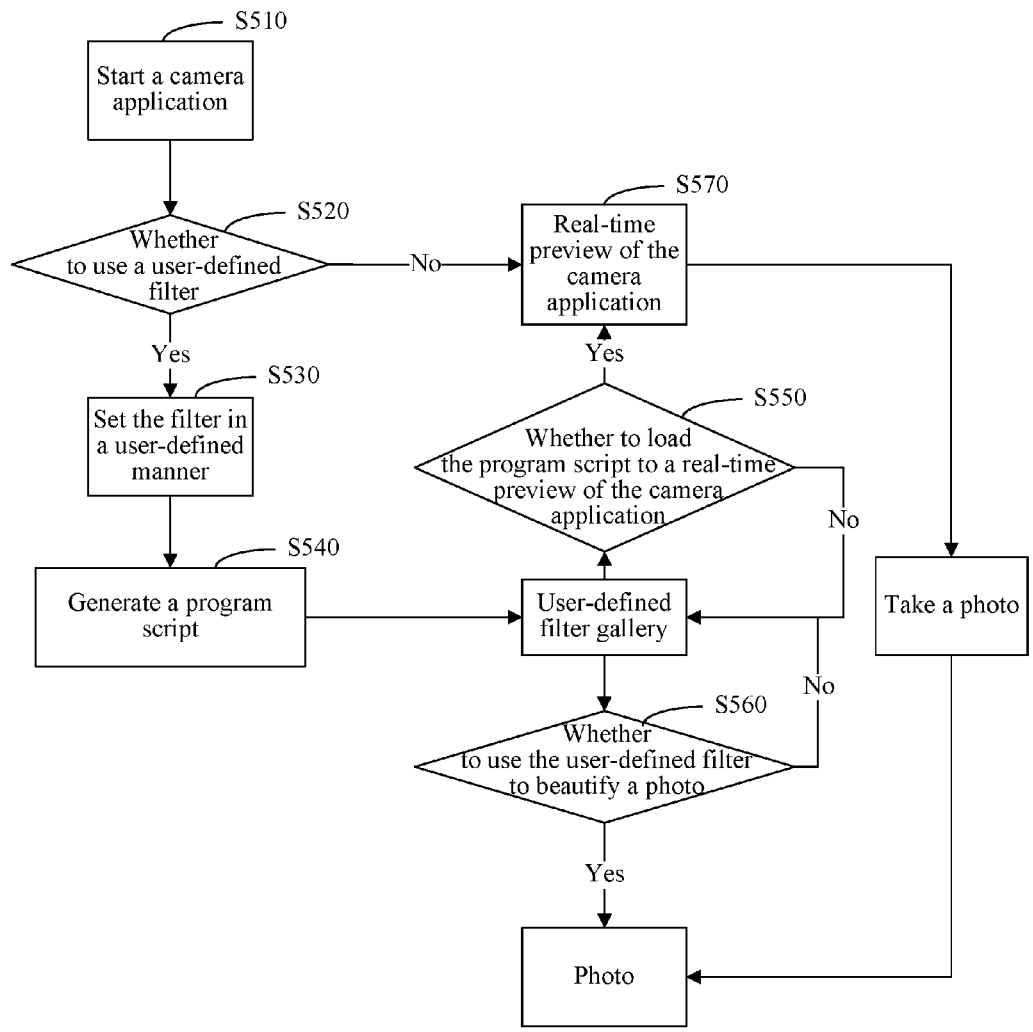
FIG. 5 is a schematic application diagram of a filter realization method of a camera application in an embodiment.

The foregoing filter realization method of a camera application is described in detail in the following with reference to a specific embodiment. In this embodiment, as shown in FIG. 5, after a camera application is started in step S510, whether to use a user-defined filter is determined in step S520, and in this case, a corresponding marquee pops up on an interface of the camera application, to obtain a user-defined filter use instruction triggered by a user or a disabling instruction of the user-defined filter.

When the user-defined filter use instruction triggered by the user is obtained, it is determined that the camera application currently may use the user-defined filter, and step S530 is performed to set the filter in a user-defined manner, that is, a user-defined photo parameter of the user is obtained by means of a photo setting operation triggered in the camera application, where the photo parameter includes a value corresponding to the hue, a value corresponding to the saturation, and a value corresponding the brightness. The user-defined photo parameter of the user is input to a vertex shader and a fragment shader to generate a corresponding program script, to provide the current user-defined filter effect to the user by using the program script.

As described in step S540, after the user-defined program script is generated, the program script is saved to a user-defined filter gallery, so that the program script can be invoked at any time.

After the generated program script is saved to the user-defined filter gallery, step S550 or step S560 is performed according to an actual situation of the current camera application.

Specifically, the program script saved in the user-defined filter gallery may be used to perform filter rendering on a photo currently obtained by the camera application, or the program script saved in the user-defined filter gallery may also be used to preview a filter effect of a current photographing picture in real time, so as to trigger photographing when a photographing picture that carries the filter effect and is most satisfactory to the user is obtained, to obtain a photo containing the filter effect.

Correspondingly, whether to load the filter effect to a real-time preview of the camera application in real time is determined in step S550, and if yes, the program script in the user-defined filter gallery is loaded to the photographing picture in the camera application, that is, step S570 is performed, so as to preview the filter effect in real time, and perform photographing to obtain the photo containing the filter effect.

In addition, whether to use the user-defined filter to beautify a photo may also be determined in step S560, and if yes, filter rendering is performed on the photo, where the photo may be a photo that does not undergo filter rendering, or may also be a photo containing the filter effect.

Figure 6:
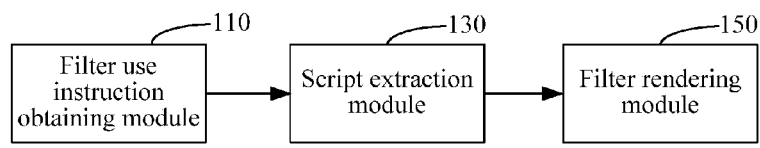
FIG. 6 is a schematic structural diagram of a filter realization apparatus of a camera application in an embodiment.

As shown in FIG. 6, in an embodiment, a filter realization apparatus of a camera application includes a filter use instruction obtaining module 110, a script extraction module 130, and a filter rendering module 150.

The filter use instruction obtaining module 110 is configured to obtain a user-defined filter use instruction.

In this embodiment, the user-defined filter use instruction is generated when a user triggers an operation of using a user-defined filter in a started camera application. In a process of using the camera application to take a photo, the user chooses to use a user-defined filter or a built-in filter effect in the camera application according to requirements.

Specifically, after the camera application is started, whether to use the user-defined filter is determined, and in this case, a corresponding marquee may pop up on an interface of the camera application, so that the user triggers the operation, where if the user triggers the operation of using the user-defined filter, it indicates that the user-defined filter is used to take a photo or beautify a photo.

The script extraction module 130 is configured to extract a program script according to the user-defined filter use instruction, where the program script is generated according to a user-defined photo parameter.

In this embodiment, the program script is a GLSL script, and is generated by the user according to a photo parameter that needs to be input in a user-defined manner, where the program script is corresponding to one filter effect, to obtain a photo containing the filter effect.

Specifically, the script extraction module 130 may learn, according to the user-defined filter use instruction, a program script currently used by the camera application, and further extract the program script, to realize a photo beautification function.

The filter rendering module 150 is configured to perform, by using the extracted program script, filter rendering on a photo obtained by triggering photographing in a camera application, to obtain a photo containing a filter effect.

In this embodiment, the filter rendering module 150 performs, by using the extracted program script, filter rendering on the photo obtained by the camera application through photographing, so that the photo carries a filter effect corresponding to the program script.

By using the foregoing apparatus, a user may set, in a user-defined manner, a filter effect to be realized, that is, the user-defined filter effect may be obtained by generating a corresponding program script by inputting a photo parameter, which brings great convenience to the user to use a camera application, thereby further enriching filter effects that can be realized in the camera application, and significantly enhancing a photo beautification function in the camera application.

Figure 7:
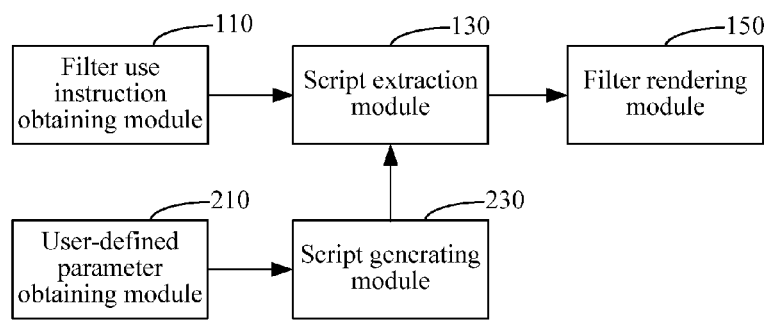
FIG. 7 is a schematic structural diagram of a filter realization apparatus of a camera application in another embodiment.

As shown in FIG. 7, in an embodiment, the apparatus further includes a user-defined parameter obtaining module 210 and a script generating module 230.

The user-defined parameter obtaining module 210 is configured to obtain a photo setting operation triggered in a camera application, and obtain a user-defined photo parameter by means of the photo setting operation.

In this embodiment, the user-defined parameter obtaining module 210 obtains a photo setting operation triggered by the user in an operation interface of the camera application, where the photo setting operation is an operation of inputting the user-defined photo parameter of the user. The photo parameter includes a value corresponding to the hue, a value corresponding to the saturation, and a value corresponding to the brightness, and the photo parameter determines the red green blue hue of pixel points in the photo.

The script generating module 230 is configured to input the user-defined photo parameter into a vertex shader and a fragment shader to generate a program script for realizing a user-defined filter effect of a photo.

In this embodiment, the vertex shader is used to calculate a location of the vertex in the photo, and transfer calculated data to the fragment shader, where the fragment shader is used to set a final color for a first pixel in the photo, and both the vertex shader and the fragment shader are based on the user-defined photo parameter of the user.

The user may randomly set the photo parameter in a user-defined manner according to requirements, to generate a corresponding program script, thereby further providing various filter effects to the photo of the camera application.

Further, the program script generated by the script generating module 230 according to the user-defined photo parameter of the user is saved to a user-defined filter gallery, so that the program script can be invoked at any time.

Figure 8:
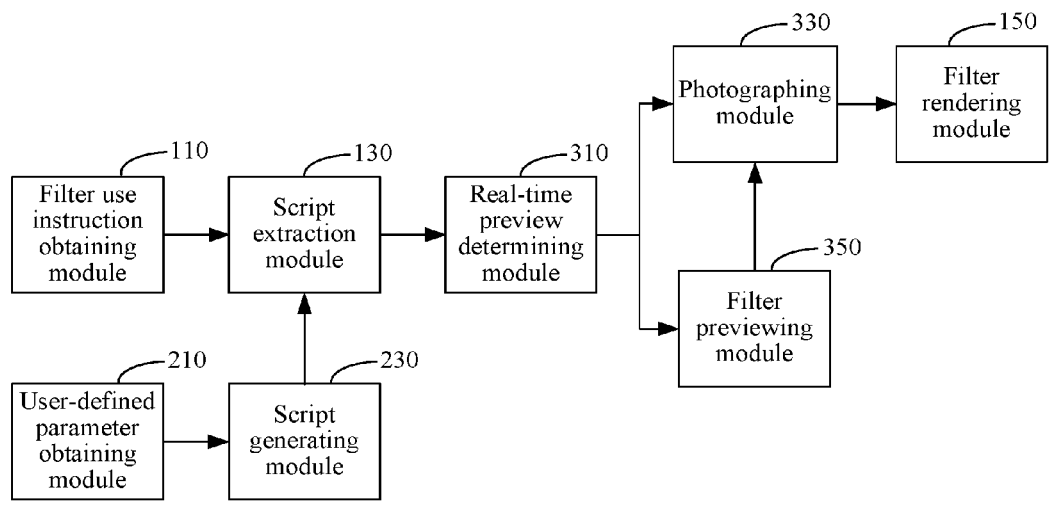
FIG. 8 is a schematic structural diagram of a filter realization apparatus of a camera application in another embodiment.

As shown in FIG. 8, in an embodiment, the apparatus further includes a real-time preview determining module 310, a photographing module 330, and a filter previewing module 350.

The real-time preview determining module 310 is configured to determine whether an extracted program script is loaded to a real-time preview of a camera application, if not, notify the photographing module 330, and if yes, notify the filter previewing module 350.

In this embodiment, after the program script generated according to the user-defined photo parameter is obtained, the real-time preview determining module 310 determines whether to load the program script to the real-time preview of the camera application. If not, it indicates that the user expects to perform filter rendering on a photo after obtaining the photo through photographing, and if yes, it indicates that a filter effect corresponding to the program script is previewed in a current photographing picture in the camera application in real time, to preview the filter effect of the current photographing picture in real time.

The photographing module 330 is configured to trigger photographing to obtain a photo.

In this embodiment, after it is determined that the extracted program script is not loaded to the real-time preview of the camera application, the photographing module 330 triggers, by means of a user operation, the camera application to perform photographing, to obtain a photo corresponding to the current photographing picture.

The filter previewing module 350 is configured to preview, by using the extracted program script, a filter effect in a photographing picture in the camera application in real time.

In this embodiment, after it is determined that the extracted program script is loaded to the real-time preview of the camera application, the filter previewing module 350 previews the filter effect of the current photographing picture in the camera application, so that the user views whether the current photographing picture is suitable, and further triggers photographing to obtain a photo containing the filter effect.

The photographing module 330 is further configured to trigger photographing to obtain a photo containing the filter effect.

Figure 9:
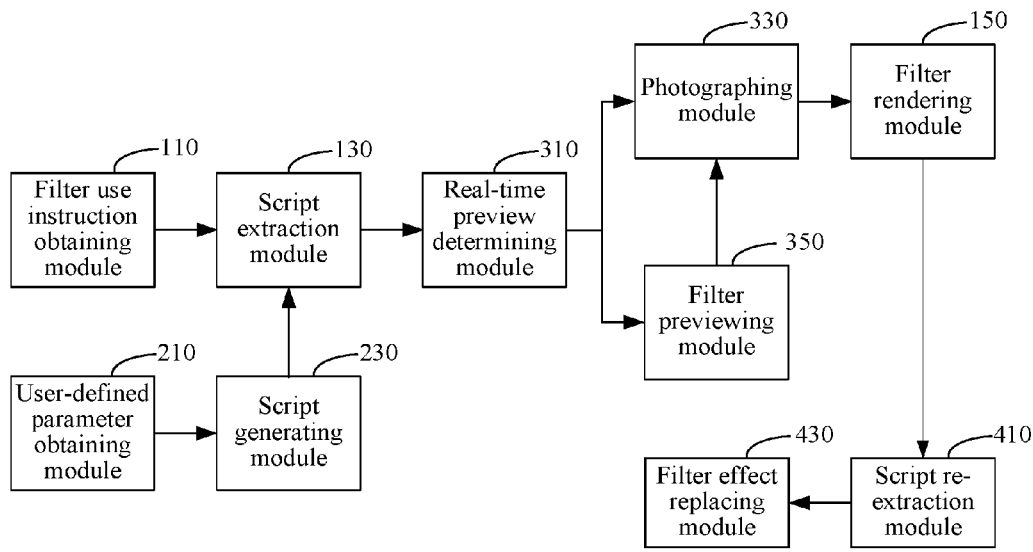
FIG. 9 is a schematic structural diagram of a filter realization apparatus of a camera application in another embodiment.

As shown in FIG. 9, in an embodiment, the apparatus further includes a script re-extraction module 410 and a filter effect replacing module 430.

The script re-extraction module 410 is configured to re-extract a program script, where the program script is distinguished from a program script extracted according to a user-defined filter use instruction.

In this embodiment, for a photo that contains a filter effect and is obtained by performing filter rendering, another program script may be further extracted to change the filter effect in the photo.

The filter effect replacing module 430 is configured to re-process, by using the re-extracted program script, the photo containing the filter effect, to replace the filter effect of the photo with a filter effect corresponding to the re-extracted program script.

In this embodiment, the filter effect replacing module 430 performs secondary beautification on the photo containing the filter effect, that is, performs filter rendering again to replace the filter effect in the photo with another user-defined filter effect, to finally obtain a most satisfactory photo of the user.

Figure 10:
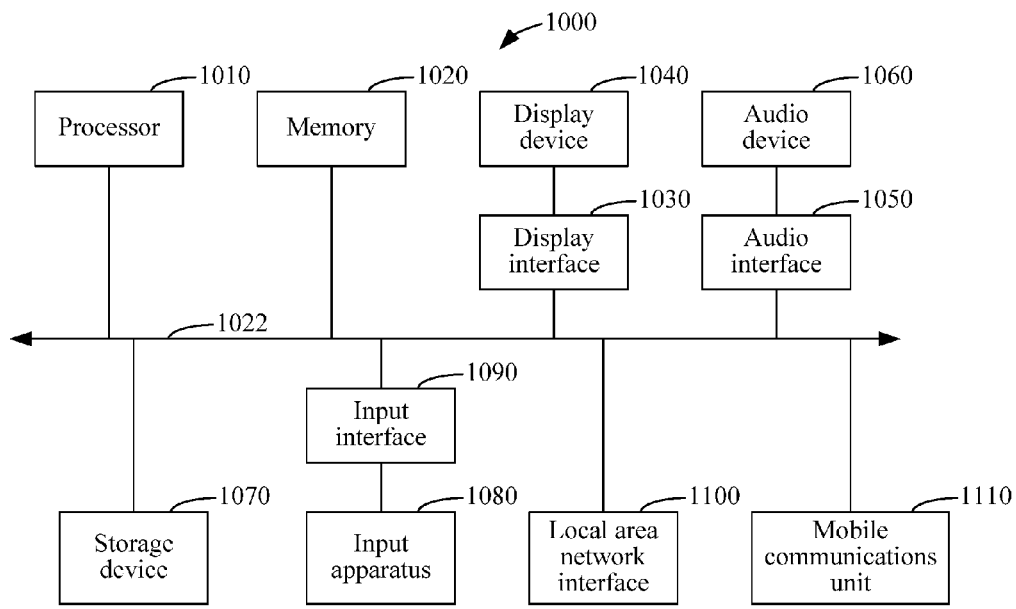
FIG. 10 is a block diagram of a computer system for implementing embodiments of the present invention.

FIG. 10 is a block diagram of a computer system 1000 that can implement embodiments of the present invention. The computer system 1000 is merely an example of computer system environments applicable to the present disclosure, and should not be construed as any limitation on the application scope of the present disclosure. The computer system 1000 also should not be interpreted as needing to rely on or have one or a combination of parts of the exemplary computer system 1000 shown in FIG. 10.

The computer system 1000 shown in FIG. 10 is an example of computer systems suitable for use in the present disclosure. Other architectures having different subsystem configurations may also be used. For example, well-known device such as a desktop computer, a notebook computer, a personal digital assistant, a smart phone, a tablet computer, a portable media player, and a set top box are applicable to some embodiments of the present disclosure, but the present disclosure is not limited thereto.

As shown in FIG. 10, the computer system 1000 includes a processor 1010, a memory 1020, and a system bus 1022. Various system components including the memory 1020 and the processor 1010 are connected to the system bus 1022. The processor 1010 is hardware for executing computer program instructions by means of basic arithmetic and logical operations in the computer system. The memory 1020 is a physical device for temporarily or permanently storing computation programs or data (for example, program state information). The system bus 1022 may be any one of the following types of bus structures: a memory bus or a memory controller, a peripheral bus and a local bus. The processor 1010 and the memory 1020 can perform data communication through the system bus 1022. The memory 1020 includes a read-only memory (ROM) or a flash memory (both not shown), and a random access memory (RAM), where the RAM generally refers to main memory loaded with an operating system and application programs.

The computer system 1000 further includes a display interface 1030 (for example, a graphics processing unit), a display device 1040 (for example, a liquid crystal display), an audio interface 1050 (for example, a sound card) and an audio device 1060 (for example, a loudspeaker). The display device 1040 and the audio device 1060 are media devices for presenting multimedia content.

The computer system 1000 generally includes one storage device 1070. The storage device 1070 may be selected from multiple types of computer readable media. The computer readable media refer to any available media that can be accessed by the computer system 1000, and includes removable media and non-removable media. For example, the computer readable media include, but limited to, a flash memory (micro SD card), a CD-ROM, a digital versatile disc (DVD), or other compact disc storage, a cassette, a magnetic tape, a disk memory or other magnetic storage devices, or any other media that can be used to store required information and can be accessed by the computer system 1000.

The computer system 1000 further includes an input apparatus 1080 and an input interface 1090 (for example, an IO controller). A user may input an instruction and information into the computer system 1000 by using the input apparatus 1080, such as a keyboard, a mouse or a touch panel device on the display apparatus 1040. The input apparatus 1080 is generally connected to the system bus 1022 through the input interface 1090, but may also be connected through other interfaces or bus structures, such as a universal serial bus (USB).

The computer system 1000 may be logically connected to one or more network devices in a network environment. The network device may be a personal computer, a server, a router, a smart phone, a tablet computer, or other public network nodes. The computer system 1000 is connected to the network device through a local area network (LAN) interface 1100, or a mobile communications unit 1110. A local area network (LAN) refers to an interconnected computer network in a limited area such as a family, a school, a computer laboratory, or an office building using network media. WiFi and Ethernet over twisted-pair are most commonly used two technologies for building a local area network. WiFi is a technology that enables the computer systems 1000 to exchange data or to be connected to a wireless network through radio waves. The mobile communications unit 1110 is capable of making and receiving calls through radio communications lines while moving in a broad geographical area. In addition to calling, the mobile communications unit 1110 also supports Internet access in a 2G, 3G, or 4G cellular communications system that provides mobile data services.

It should be noted that other computer systems including more or fewer subsystems than those of the computer system 1000 are also applicable to the present disclosure. For example, the computer system 1000 may include a Bluetooth unit capable of exchanging data in a short distance, an image sensor for capturing images, and an accelerometer for measuring the acceleration.

As described above in detail, the computer system 1000 applicable to the present disclosure can execute specified operations in the filter realization method of a camera application. The computer system 1000 executes these operations in the form of running software instructions in the computer readable media by the processor 1010. These software instructions may be read into the memory 1020 from the storage device 1070 or from another device through the local area network interface 1100. The software instructions stored in the memory 1020 enable the processor 1010 execute the filter realization method of a camera application. Moreover, the present disclosure may also be implemented by using a hardware circuit or by using a combination of a hardware circuit and software instructions. Therefore, the implementation of the present disclosure is not limited to any particular combination of a hardware circuit and software.

The foregoing embodiments only describe several implementation manners of the present disclosure, and their description is specific and detailed, but cannot therefore be understood as a limitation to the patent scope of the present disclosure. It should be noted that, a person of ordinary skill in the art may further make variations and improvements without departing from the concept of the present disclosure, and these all fall within the protection scope of the present disclosure. Therefore, the patent protection scope of the present disclosure shall be subject to the appended claims.

What is claimed is:

1. A filter realization method of a camera application, comprising:
    obtaining a user-defined filter use instruction;
    extracting a program script according to the user-defined filter use instruction, wherein the program script is generated according to a user-defined photo parameter; and
    performing, by using the extracted program script, filter rendering on a photo obtained by triggering photographing in a camera application, to obtain a photo containing a filter effect;
    wherein before the step of extracting a program script according to the user-defined filter use instruction, the method further comprises:
    obtaining a photo setting operation triggered in the camera application, and obtaining a user-defined photo parameter by means of the photo setting operation; and
    inputting the user-defined photo parameter into a vertex shader and a fragment shader to generate a program script for realizing a user-defined filter effect of a photo.

2. The method according to claim 1, wherein before the performing, by using the extracted program script, filter rendering on a photo obtained by triggering photographing in a camera application, the method comprises:
    determining whether the extracted program script is loaded to a real-time preview of the camera application, and if not,
    triggering photographing to obtain a photo.

3. The method according to claim 2, wherein the method further comprises:
    if it is determined that the extracted program script is loaded to the real-time preview of the camera application,
    previewing, by using the extracted program script, a filter effect in a photographing picture in the camera application in real time; and
    triggering photographing to obtain a photo containing the filter effect.

4. The method according to claim 1, wherein the method further comprises:
    re-extracting a program script, wherein the program script is distinguished from the program script extracted according to the user-defined filter use instruction; and
    re-processing, by using the re-extracted program script, the photo containing the filter effect, to replace the filter effect of the photo with a filter effect corresponding to the re-extracted program script.

5. A filter realization apparatus of a camera application, comprising:
    a filter use instruction obtaining module, configured to obtain a user-defined filter use instruction;
    a script extraction module, configured to extract a program script according to the user-defined filter use instruction, wherein the program script is generated according to a user-defined photo parameter; and
    a filter rendering module, configured to perform, by using the extracted program script, filter rendering on a photo obtained by triggering photographing in a camera application, to obtain a photo containing a filter effect;
    wherein the apparatus further comprises:
    a user-defined parameter obtaining module, configured to obtain a photo setting operation triggered in the camera application, and obtain a user-defined photo parameter by means of the photo setting operation; and
    a script generating module, configured to input the user-defined photo parameter into a vertex shader and a fragment shader to generate a program script for realizing a user-defined filter effect of a photo.

6. The apparatus according to claim 5, wherein the apparatus further comprises:
    a real-time preview determining module, configured to determine whether the extracted program script is loaded to a real-time preview of the camera application, and if not, notify a photographing module, wherein the photographing module is configured to trigger photographing to obtain a photo.

7. The apparatus according to claim 6, wherein the apparatus comprises a filter previewing module, if the real-time preview determining module determines that the extracted program script is loaded to the real-time preview of the camera application, notify the filter previewing module, wherein the filter previewing module is configured to preview, by using the extracted program script, a filter effect in a photographing picture in the camera application in real time; and the photographing module is further configured to trigger photographing to obtain a photo containing the filter effect.

8. The apparatus according to claim 5, wherein the apparatus further comprises:

a script re-extraction module, configured to re-extract a program script, wherein the program script is distinguished from the program script extracted according to the user-defined filter use instruction; and a filter effect replacing module, configured to re-process, by using the re-extracted program script, the photo containing the filter effect, to replace the filter effect of the photo with a filter effect corresponding to the re-extracted program script.

\* \* \* \* \*